United States Patent [19]

Hamasaki et al.

[11] Patent Number: 5,331,415
[45] Date of Patent: Jul. 19, 1994

[54] NOISE REDUCTION APPARATUS FOR REDUCING NOISE IN AN INPUT VIDEO SIGNAL

[75] Inventors: Takeshi Hamasaki, Yao; Yoshinori Kitamura, Takatsuki, both of Japan

[73] Assignee: Matsushita Electric Industrial Co., Ltd., Kadoma, Japan

[21] Appl. No.: 867,216
[22] PCT Filed: Oct. 3, 1991
[86] PCT No.: PCT/JP91/01332
    § 371 Date: Jul. 31, 1992
    § 102(e) Date: Jul. 31, 1992
[87] PCT Pub. No.: WO92/06559
    PCT Pub. Date: Apr. 16, 1992

[30] Foreign Application Priority Data

Oct. 5, 1990 [JP] Japan .................................. 2-269105
Oct. 23, 1990 [JP] Japan .................................. 2-286204

[51] Int. Cl.$^5$ .................................................. H04N 5/21
[52] U.S. Cl. ................................................ 348/607; 358/340
[58] Field of Search .............. 358/166, 167, 36, 340, 358/336, 37; H04N 5/21, 5/213

[56] References Cited

U.S. PATENT DOCUMENTS

| | | | |
|---|---|---|---|
| 4,163,258 | 7/1979 | Ebihara et al. | 358/167 |
| 4,242,705 | 12/1980 | Ebihara | 358/167 |
| 4,442,454 | 4/1984 | Powell | 358/167 |
| 4,484,234 | 11/1984 | Kimura | 358/340 |
| 4,807,033 | 2/1989 | Kessen et al. | 358/37 |
| 4,945,502 | 7/1990 | Kuon et al. | 358/167 |

FOREIGN PATENT DOCUMENTS

| | | | |
|---|---|---|---|
| 0158274 | 7/1986 | Japan | H04N 5/21 |
| 61-42910 | 9/1986 | Japan . | |
| 62-5388 | 2/1987 | Japan . | |
| 62-26981 | 2/1987 | Japan . | |
| 63-211977 | 9/1988 | Japan . | |
| 2099657 | 12/1982 | United Kingdom . | |

OTHER PUBLICATIONS

The Journal of Institute of Television Engineers of Japan, vol. 37, No. 12, 1983, pp. 1030 (56)-1036 (62).

Primary Examiner—Victor R. Kostak
Assistant Examiner—Jeffrey J. Murrell
Attorney, Agent, or Firm—Cushman, Darby & Cushman

[57] ABSTRACT

A noise reduction apparatus for reducing the noise in an input video signal. The input video signal contains pixel data; and, the noise reduction apparatus has a first delay, a subtractor, a second delay, a transformer, a nonlinear calculator, an inverse-transformer, and an adder. The first delay delays an input video signal to derive a first delayed video signal. The subtractor subtracts the first delayed video signal from the input video signal, and outputs a finite difference signal. The second delay delays the finite difference signal by one horizontal scanning period. The transformer forms a signal block from the field difference signal which includes a first predetermined number of pixel data; and, in the signal block, transforms the pixel data into a second predetermined number of characteristic components based on the finite difference signal and the finite difference signal delayed by the second delay. The transformer shifts the signal block one pixel in a predetermined direction after every transforming operation. The nonlinear calculator applies a nonlinear calculation to the characteristic components. The inverse-transformer derives one compensation output corresponding to the signal block on the basis of the output signal of said nonlinear calculator. The adder adds the compensation output to the input video signal to reduce the noise in the input video signal.

7 Claims, 8 Drawing Sheets

Former field

Present field

Field difference signal $F_{00}$

Clip level $F_{01}$ $F_{02}$ $F_{03}$ $x_{10}$

Peak

Present field $-x_{10}$

Ringing component $x_{11}$

Present field $-x_{11}$ $x_{12}$ $x_{13}$

Sample clock

NOISE REDUCTION APPARATUS FOR REDUCING NOISE IN AN INPUT VIDEO SIGNAL

BACKGROUND OF THE INVENTION

1. Introduction

The present invention relates to a noise reduction apparatus which is mounted on a household VTR or the like.

2. Description of the Related Art

Recently, a noise reduction apparatus for reducing noise in playing is being mounted on a household VTR or the like. A signal processing method of a conventional noise reduction apparatus is elucidated hereafter.

The conventional noise reduction apparatus is based on the fact that the noise is noncorrelative, whereas a video signal has a strong correlation between fields or frames. Noise reduction is attempted by deriving a weighted mean with respect to the signal of the previous one field or frame.

A general configuration of a noise reduction apparatus of a field recursive type is represented by the following equation.

$$Y_n = (1-k)x_n + ky_{n-1} = x_n - k(x_n - y_{n-1}) \quad (1),$$

where: $0 \leq k \leq 1$ $x_n$: input signal
$y_{n-1}$: field memory output signal
$Y_n$: output signal.

As is understood from the equation (1), a process which derives a weighted mean of two fields is equivalent to a process where a difference signal (hereinafter referred to as a field difference signal) between the two fields is multiplied by a constant and then subtracted from the input signal.

Hereafter, the multiplication process of k and the field difference signal $(x_n - y_{n-1})$ in the equation (1) is elucidated.

In the equation (1), in the field difference signal $(x_n - y_{n-1})$, noise has been extracted in a still picture part and a signal in a moving picture part, respectively.

With respect to the field difference signal, a small amplitude is regarded as noise, and a subtractive quantity from the input signal is increased by bringing the valve of k close to 1.

Moreover, as the amplitude becomes larger, this is regarded as variation of the signal, and k is close to 0. A nonlinear process is applied so as to decrease the subtractive quantity from the input signal.

This is based on a fact that in general the amplitude of the noise is smaller in comparison with that of the signal, and the result $k(x_n - y_{n-1})$ of the nonlinear operation can be regarded as extracted noise.

However, in the noise reduction apparatus of the above constitution, since the above operation is individually performed for each pixel, the signal or the noise is difficult to distinguish with respect to a little movement, and an afterimage tends to be produced.

In contrast with this, there is a proposal of a noise reduction apparatus wherein Hadamard transformation, one of orthogonal transformations, is applied to the field or the frame difference signal and extraction of the feature of a picture is performed. In this apparatus, separation of the noise is made relatively easy (for example, The Journal of Institute of Television Engineers of Japan, Vol. 37, No. 12, 1983).

The principle of this kind of a noise reduction apparatus is briefly elucidated.

A signal block is formed by extracting four data in horizontal direction, two in vertical direction, i.e. eight data in total from the field or the frame difference signal derived by subtracting the output of a field or a frame memory from an input video signal. The Hadamard transformation of 2×4 dimension is then applied. The Hadamard transformation is a kind of frequency conversion, and each data in the above-mentioned block is separated into eight spatial frequency components.

With respect to each transformed component derived by the Hadamard transformation, the above-mentioned nonlinear operation is applied and a noise component is extracted. This is returned to the eight data by Hadamard inverse transformation, and is made into noise. The noise is extracted from each data of the difference signal of the field or the frame in the original block and is subtracted from the input signal to carry out the noise reduction.

Since the signal which is included in each data in the signal block is considered to have a specific frequency component, the signal concentrates at some of transformation component by applying the Hadamard transformation. In contrast, the frequency component of the noise is considered to be random, and is divided equally into each component.

Therefore, in the transformed component where the signal does not concentrate, only the noise can be extracted. In the transformed component where the signal concentrates, a level difference of the signal and the noise increases and a rate of the signal which is included in the extracted noise decreases. For this reason, the noise reduction apparatus wherein occurrence of afterimage is reduced can be constituted.

However, in the conventional noise reduction apparatus as mentioned above, if a signal block is taken so that the data does not overlap, discontinuity of data, so-called block distortion is absolutely susceptible to occurrence at the boundary of the block.

Moreover, if the transformation is performed so that a part of the data overlaps between the signal blocks, though the block distortion is alleviated, an after process so as to average among data is required since the inversely transformed data also overlaps, and the apparatus circuit scale increases.

Furthermore, since two data are required in the vertical direction in order to constitute a block, a 1H (H: horizontal scanning period) delay element is required before a Hadamard transformation device and after a Hadamard inverse-transformation device. Moreover, in order to coincide a timing of an extracted noise derived by the Hadamard inverse-transformation device and an input video signal, another 1H delay element is required. This also causes increase in the circuit scale.

SUMMARY OF INVENTION

The object of the present invention is to resolve the problems of the conventional noise reduction apparatuses to provide a noise reduction apparatus wherein occurrence of afterimage is few and a block distortion is suppressed. A further object of the present invention is to limit to minimum the increase in circuit scale.

In order to attain these objectives, the noise reduction apparatus of the present invention comprises: delay means for delaying a video signal, a first subtracter for subtracting the output signal of said delay means from an input video signal, a 1H delay element for delaying the output signal of said first subtracter by 1H (H: horizontal scanning period), transformation means by which a signal block is formed by the output signal of said first subtracter and the output signal of said 1H delay element, and for transforming to a character component, nonlinear process part for nonlinear-processing the output signal of said transformation means, inverse transformation means for deriving only one data in said signal block, and a second subtracter for subtracting the output of said inverse transformation means from said input video signal, whereby the block distortion is made to be not conspicuous, an input signal to said delay means, and by carrying out periodic transformation/inverse transformation by moving the block in the horizontal direction one by one of pixel, by outputting the output signal of said second subtracter or the output signal of said delay means.

Moreover, the present invention reduces the number of delay element, and hence, the hardware. The present invention further suppresses ringing which is generated in the case where the edge of large level difference moves.

DETAILED DESCRIPTION OF THE PREFERRED EMBODIMENTS

Hereafter, a noise reduction apparatus which is a first embodiment of the present invention is elucidated with reference to the figures.

Figure 1:
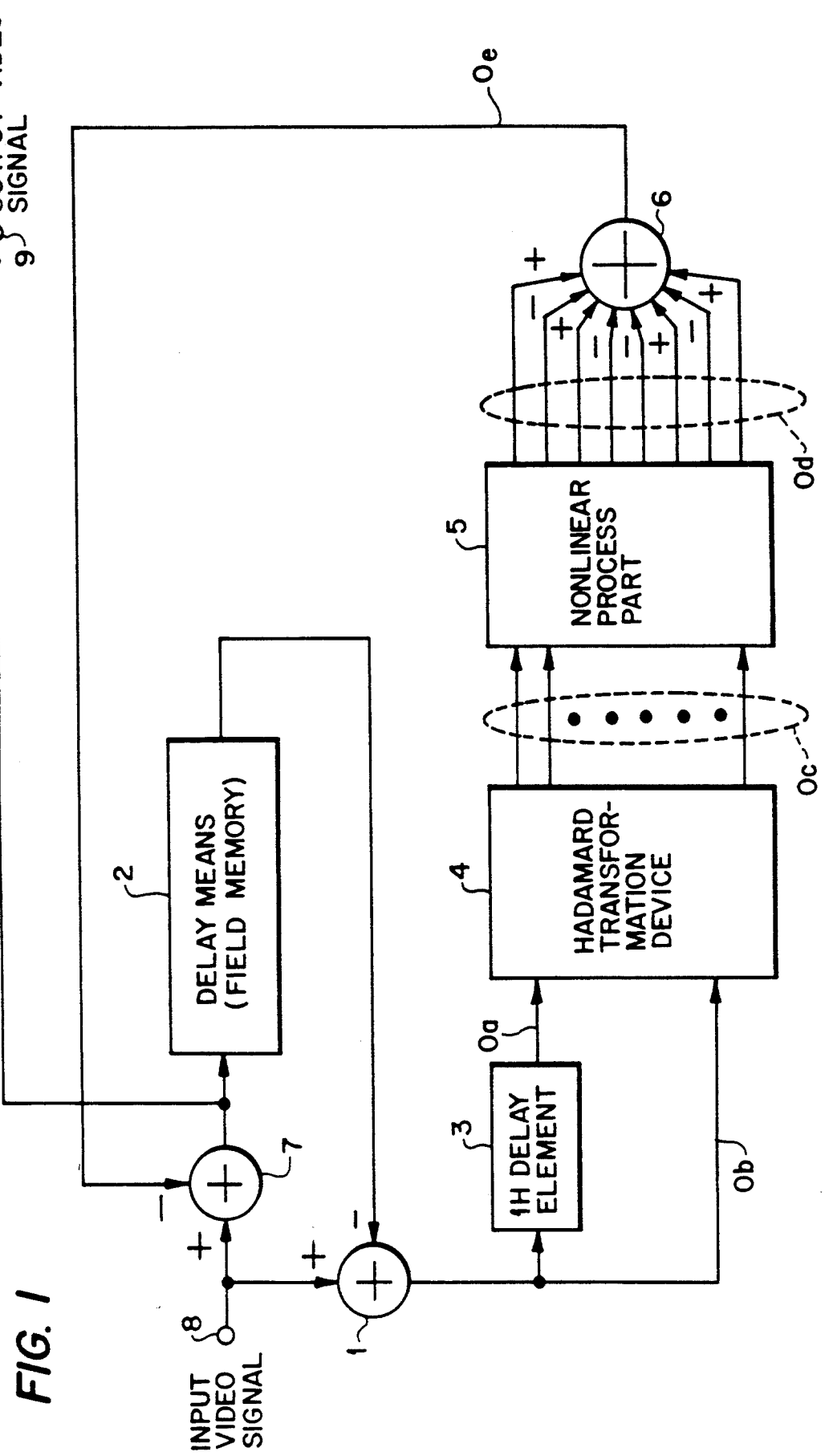
FIG. 1 is a block diagram showing a constitution of the noise reduction apparatus in the embodiment of the present invention.
Figure 4:
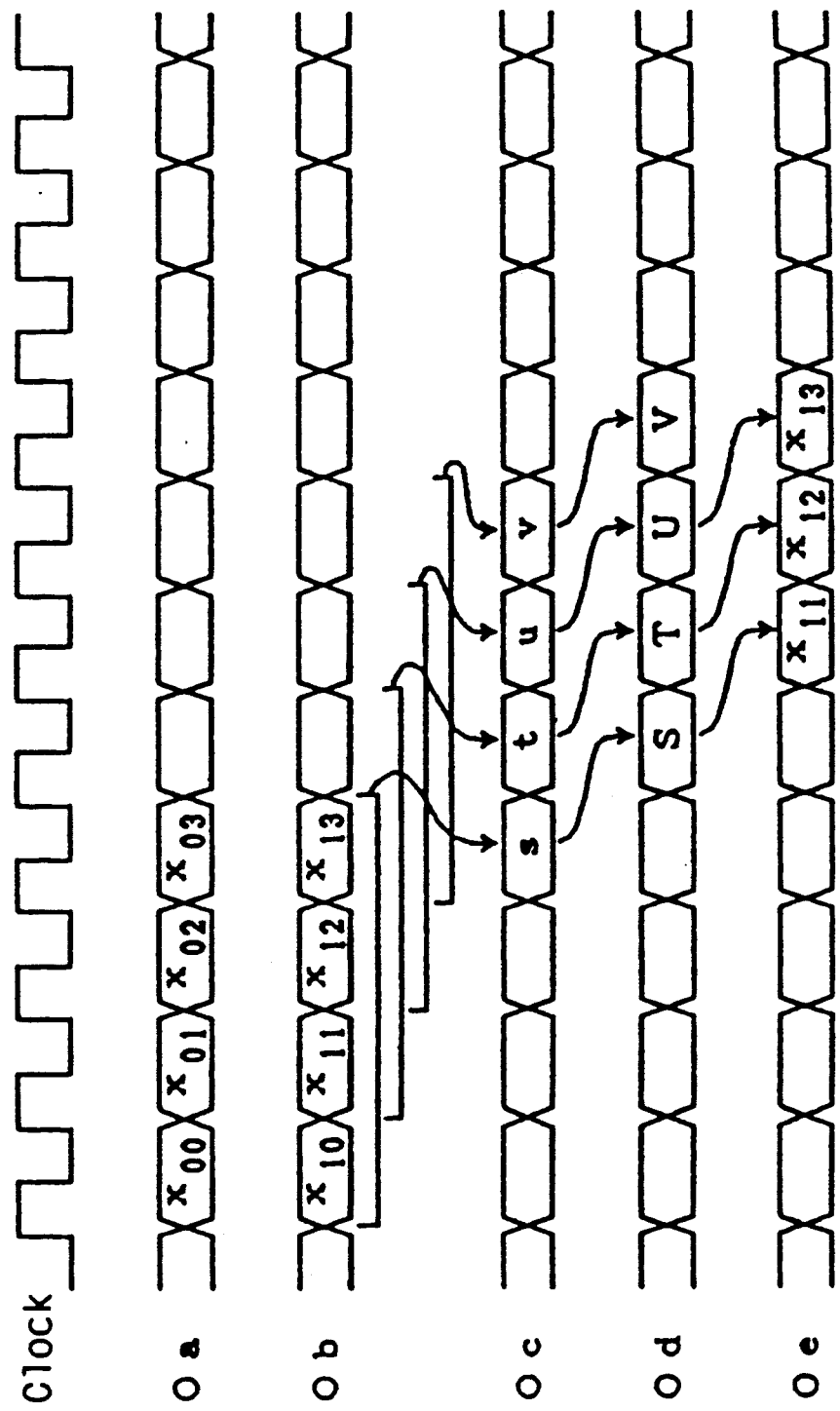
FIG. 4 is a timing chart showing the state of data at each part of FIG. 1.

FIG. 1 shows a block diagram of the noise reduction apparatus which is the first embodiment of the present invention. And, FIG. 4 represents the state of data of parts Oa—Oe of FIG. 1.

In the present embodiment, the case using a field memory for delay means 2 is elucidated.

A field difference signal Ob obtained by subtracting the output of a field memory 2 from an input video signal by a first subtracter 1 is inputted to 1H delay element 3 and an Hadamard transformation device 4.

In the Hadamard transformation device 4, first a block is constituted by the field difference signal Ob of the output of the first subtracter 1 and a signal Oa 1H-delayed the output of the first subtracter 1 by the 1H delay element 3 as shown in 2.

Figure 2:
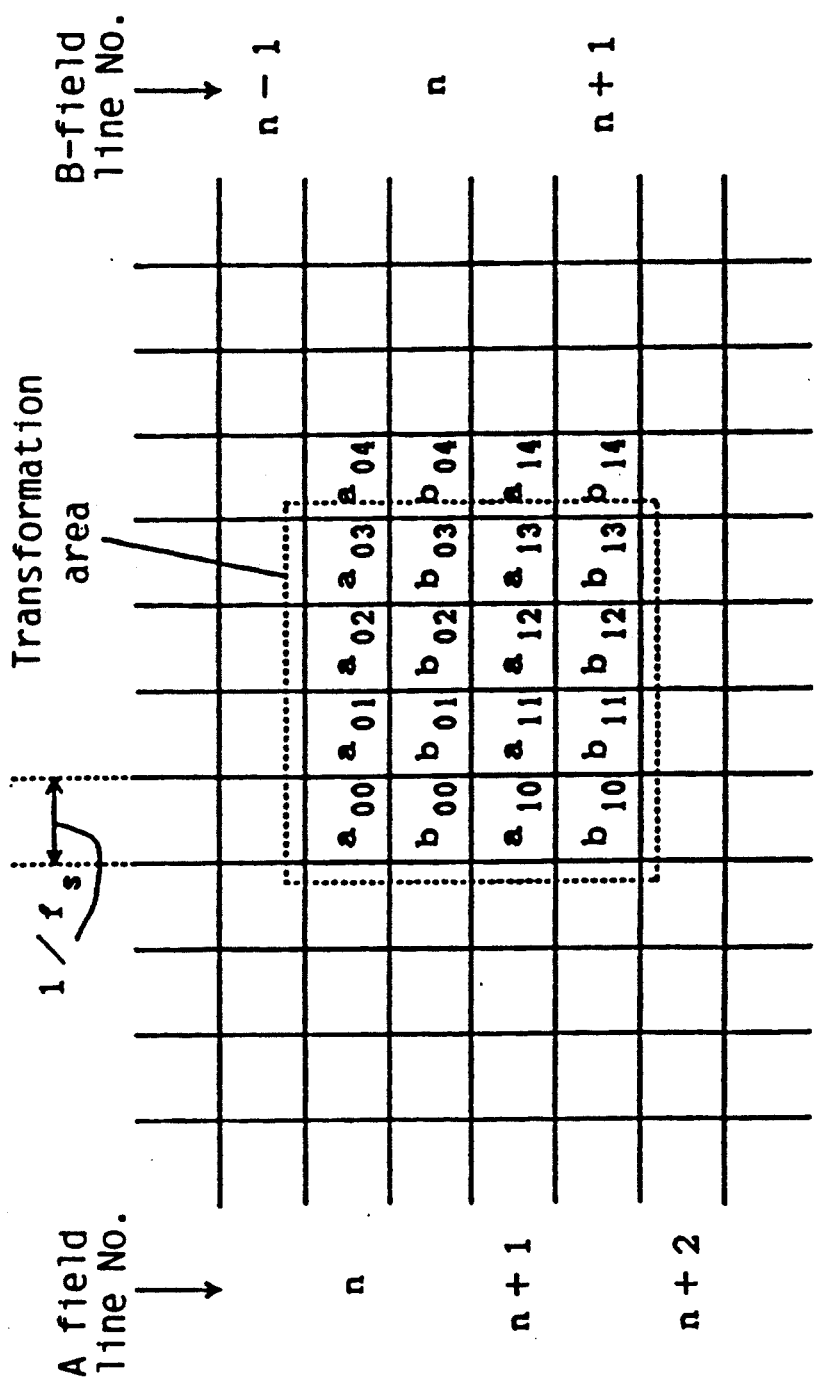
FIG. 2 is a typical diagram showing an input signal block of Hadamard transformation.

FIG. 2 shows relation of the block and the input video signal. Each square box shows a pixel. Pixels of an A-field are shown by letters $a_{00}$—$a_{04}$ and $a_{10}$—$a_{14}$, pixels of a b-field are shown by letters $b_{00}$—$b_{04}$ and $b_{10}$—$b_{14}$.

The relation of these pixels (i.e., data) and the field difference signals $x_{00}$–$x_{04}$ and $x_{10}$–$x_{14}$ is shown by the following equations.

$$x_{0n}=a_{0n}-b_{0n} \qquad (2),$$

$$x_{1n}=a_{1n}-b_{1n} \qquad (3),$$

where, letter n is 0–4 (natural number including 0). Equations (2) and (3) represent the case where the A-field is an input signal and the B-field is an output signal of the field memory 2. In the case where the B-field is the input signal, the signs (+ and −) in the right side become inverse.

What is shown as a transformation area in FIG. 2 means that eight field difference signal data $x_{00}$–$x_{03}$ and $x_{10}$–$x_{13}$ which are derived by the sixteen pixel data in the area become objective data. The objective data forming a signal block. As shown in FIG. 2, the block is constituted of field difference signal data of four consecutive data in the horizontal direction, and two in the vertical direction.

Two-dimensional Hadamard transformation of 2×4 dimension is applied to the data $x_{00}$–$x_{03}$ and $x_{10}$–$x_{13}$ in the block constituted above. The next block to be Hadamard transformed is $x_{01}$–$x_{04}$ and $x_{11}$–$x_{14}$ which is obtained by moving the transformation area rightward in the horizontal direction by one pixel.

An equation of the two-dimensional Hadamard transformation of 2×4 dimension is represented by $$F = H_2 \cdot X \cdot H_4 \qquad (4).$$

There, F is a Hadamard transformation component, X is a matrix which is composed of the field difference signal data $x_{00}$–$x_{03}$ and $x_{10}$–$x_{13}$ which are shown by FIG. 2 and equation (2), equation (3), $H_2$, $H_4$ are Hadamard matrixes of 2-dimension and 4-dimension, respectively, and these are represented by the following equations:

$$F = \begin{vmatrix} F_{00} & F_{01} & F_{02} & F_{03} \\ F_{10} & F_{11} & F_{12} & F_{13} \end{vmatrix} \qquad (5)$$

$$X = \begin{vmatrix} X_{00} & X_{01} & X_{02} & X_{03} \\ X_{10} & X_{11} & X_{12} & X_{13} \end{vmatrix} \qquad (6)$$

$$H_2 = \begin{vmatrix} 1 & 1 \\ 1 & -1 \end{vmatrix}, H_4 = \begin{vmatrix} H_2 & H_2 \\ H_2 & -H_2 \end{vmatrix}. \qquad (7)$$

Figure 5:
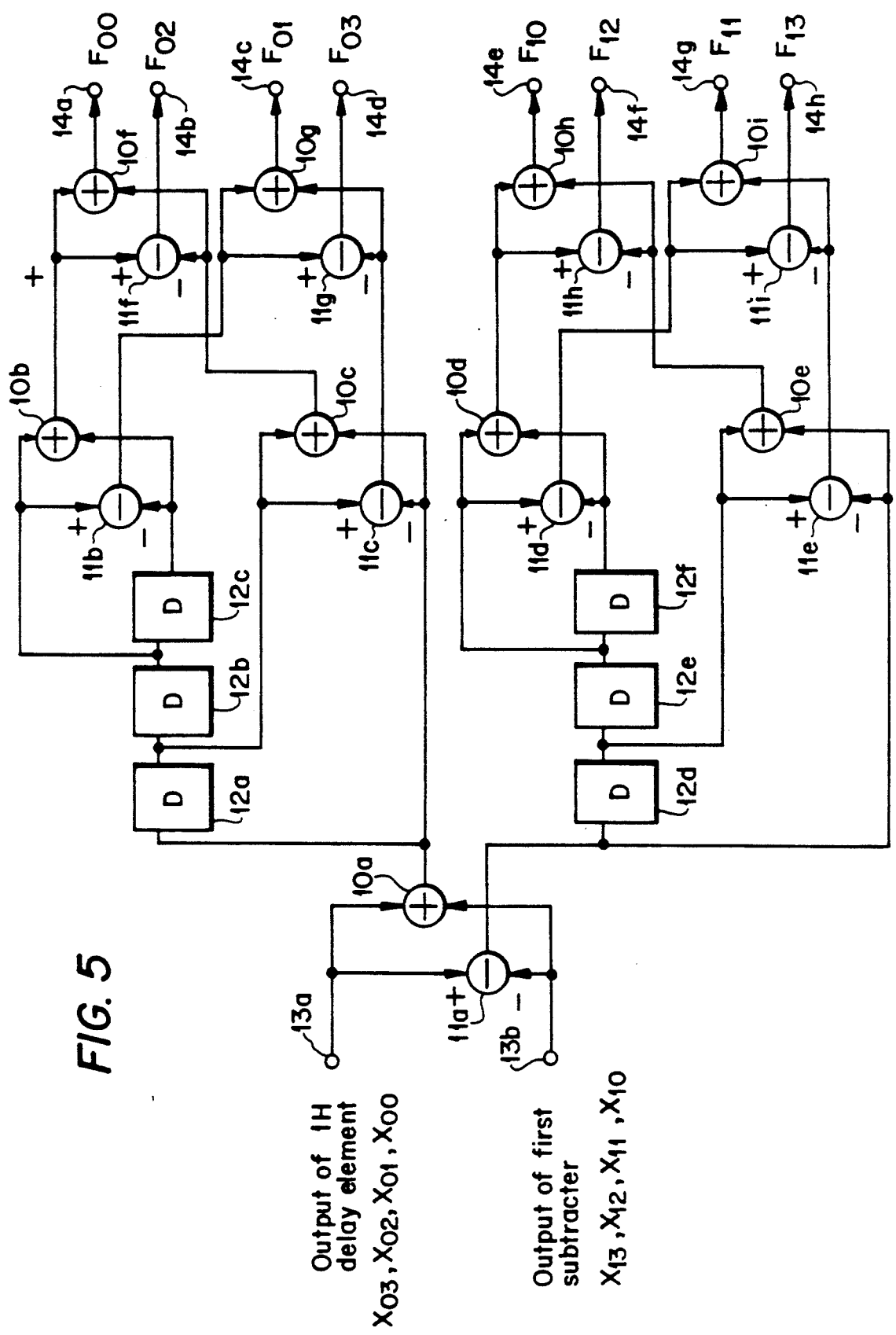
FIG. 5 is a block diagram showing a concrete example of an Hadamard transformation device.

An example of concrete constitution of the Hadamard transformation device 4 is shown in FIG. 5. In FIG. 5, numerals $10_a$–$10_i$ designate adders, numerals $11_a$–$11_i$ designate subtracters, numerals $12_a$–$12_f$ designate D-type flip-flop (hereinafter is referred to as D-FF). In order to simplifies the figure, a clock line of the D-FF is omitted.

The data $x_{00}$, $x_{01}$, $x_{02}$, $x_{03}$, $x_{04}$, ... from an input terminal 13a, and the data $x_{10}$, $x_{11}$, $x_{12}$, $x_{13}$, $x_{14}$, ... from an input terminal 13b are inputted in synchronism with the clock, respectively. Hereafter, $F_{00}$ and $F_{02}$ in the equation (4) are cited for examples, and the process by which these are derived is elucidated by using FIG. 5 and FIG. 6.

Figure 6:
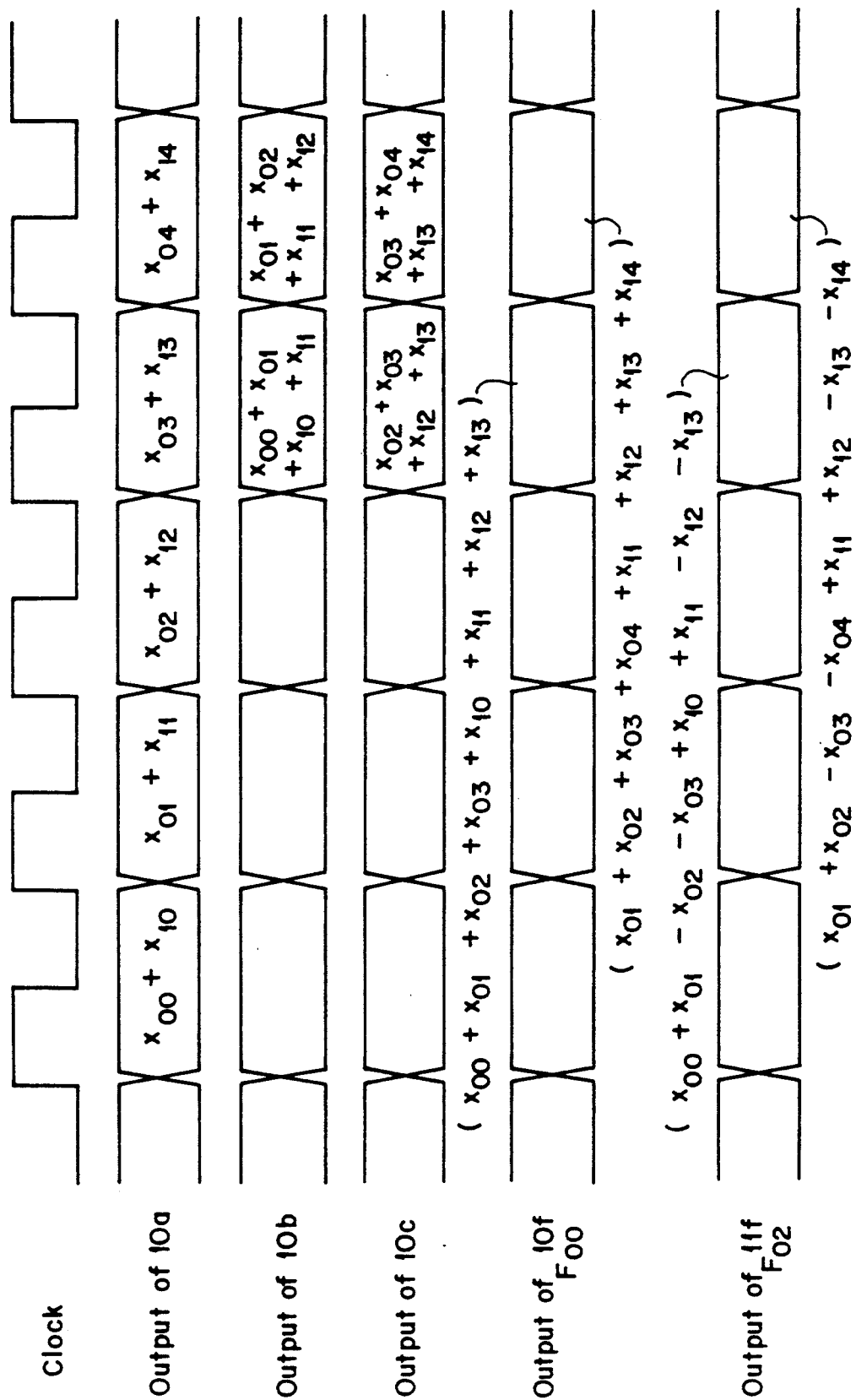
FIG. 6 is a timing chart showing operation of FIG. 5.

FIG. 6 is a timing chart showing timings of the outputs of the adders 10a, 10b, 10c, 10f and the subtracter 11f. In the adder 10a, the sum of vertically neighboring samples is derived. In the adder 10b, the sum of the output data of the D-FFs 12b and 12c is derived. In a similar manner, in the adder 10c the sum of the output data of the adder 10a and the D-FFs 12a is derived. And, in the adder 10f the sum of the outputs of the adders 10b and 10c is derived. When $F_{00}$ is represented by the equations (4)–equation (7), the following holds:

$$F_{00}=x_{00}+x_{01}+x_{02}+x_{03}+x_{10}+x_{11}+x_{12}+x_{13} \quad (8),$$

and therefore, it is recognized that the output of the adder 10f is equal to $F_{00}$ from FIG. 6.

In a similar manner, the difference of the outputs of the adders 10b and 10c is derived in the subtracter 11f, and $F_{02}$ is represented by the equation (4)–equation (7), the following holds:

$$F_{02}=x_{00}+x_{01}-x_{02}-x_{03}+x_{10}+x_{11}-x_{12}-x_{13} \quad (9),$$

and therefore, it is recognized that the output of the subtracter 11f is equal to $F_{02}$ by FIG. 6.

Other transformation components are also derived through the quite similar process. Now, by using the circuit shown in FIG. 5, a transformed result of a block which was made to move rightward by one pixel in the horizontal direction in FIG. 2 can be derived after one clock. For example, a timing at which the transformed result with respect to $x_{01}$-$x_{04}$, $x_{11}$-$x_{14}$ is derived from FIG. 2 and FIG. 6 is the time which is one clock after the timing at which the transformed result of $x_{00}$-$x_{03}$, $x_{10}$-$x_{13}$ is derived.

The Hadamard-transformed signals $F_{00}$-$F_{13}$ represent the following $F_{00}$: two-dimensional low frequency component,
$F_{01}$-$F_{03}$: horizontal direction high frequency component,
$F_{10}$: vertical direction high frequency component,
$F_{11}$-$F_{13}$: oblique direction component, respectively. The field difference signal concentrates on at least one of these. For example, if a part having a moving in lateral direction is transformed, it concentrates on $F_{00}$-$F_{03}$ components. This state is shown in FIG. 7.

Figure 7:
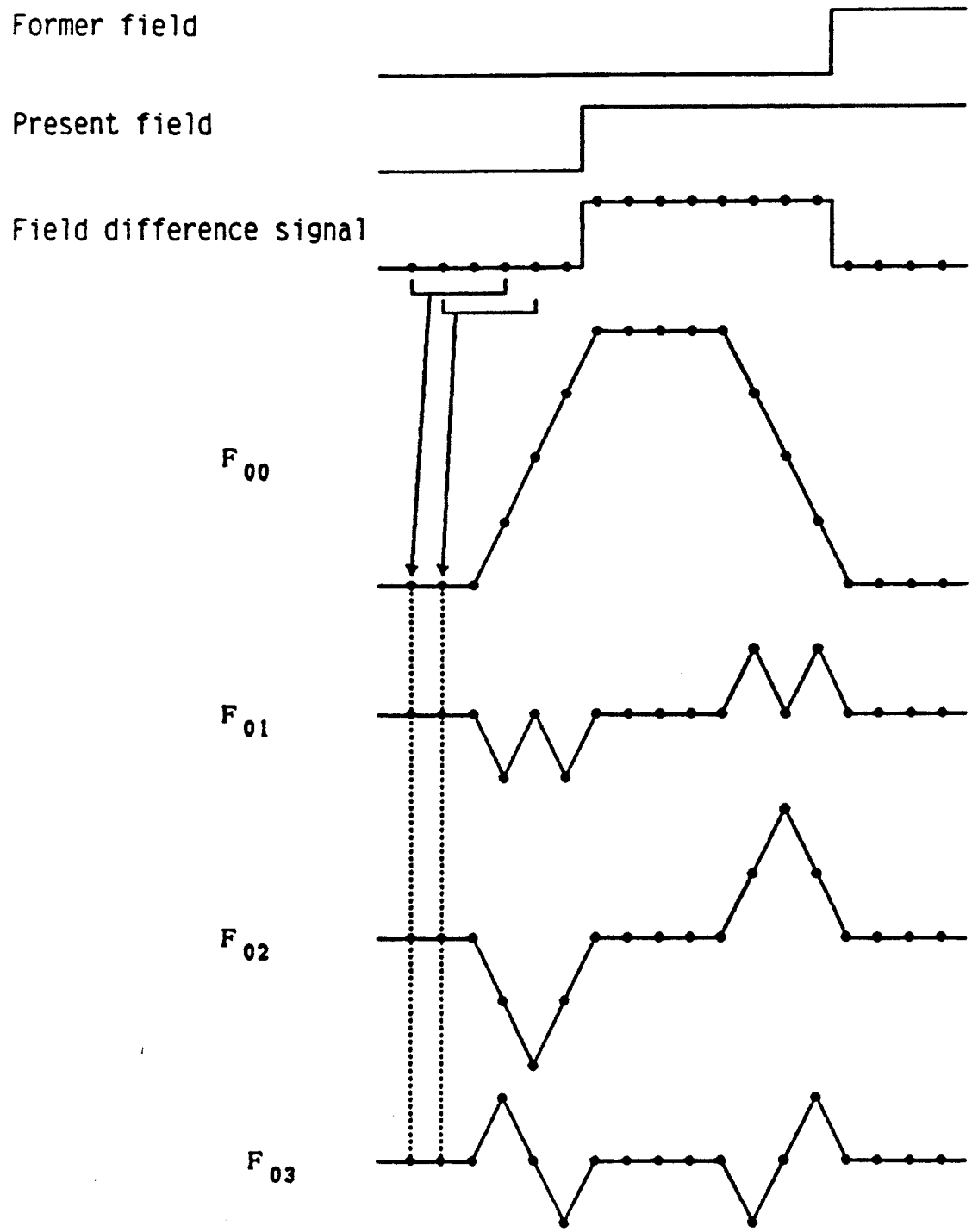
FIG. 7 is a timing chart showing waveforms of the Hadamard transformation component in the case that an edge which is uniform in the vertical direction have moved in the horizontal direction.

FIG. 7 shows waveforms of the respective components $F_{00}$-$F_{03}$ along the horizontal direction of the picture screen in the case that a level difference exists in the horizontal direction and an edge which is uniform in vertical direction have moved in the horizontal direction. The field difference signal is a result which has subtracted the signal of the previous field from the signal of the present field, and $F_{00}$-$F_{03}$ are what are derived by using the data of sampling points which are shown by dots on the waveform of the field difference signal. As shown in the figure, a block is constituted by taking four points in the horizontal direction from the point of the left end, and the values of $F_{00}$-$F_{03}$ which are derived from the block are written at the left end. Hereafter, the block position is moved one point by one point to the horizontal direction and the values of $F_{00}$-$F_{03}$ which are derived from the respective blocks are plotted successively.

According to the same figure, it is recognized that the signal arises with a large level which is equal or larger in comparison with before transformation in the respective components.

Therein, when consideration is made on the cases of $F_{10}$-$F_{13}$ which are remaining transformation components, for example $F_{10}$ becomes:

$$F_{10}=x_{00}+x_{01}+x_{02}+x_{03}-x_{10}-x_{11}-x_{12}-x_{13} \quad (10),$$

from the equation (4)–equation (7), and hence the signal component does not appear in this case, since a difference is taken in the vertical direction. In the similar manner, concerning $F_{11}$-$F_{13}$, signal components do not appear either.

In the case that a motion exists in the vertical direction, concentration to the $F_{00}$ and $F_{10}$ components can be elucidated similarly.

In contrast with this, it is considered that the noise existing on the signal is dispersed uniformly into the respective components if it is random noise, because it does not comprise specific spacial frequency component, and yet the level lowers in comparison with before the transformation case.

For this reason, in the case like the above-mentioned example, only noise appears in $F_{10}$-$F_{13}$, and in $F_{00}$-$F_{03}$ the signal appears with a level which is equal or larger than before transformation, and the noise arises with a smaller level than before the transformation.

Therefore, on the occasion of the noise extraction process in the nonlinear process which will be described hereafter, solely the noise can be extracted in the transformation components $F_{10}$-$F_{13}$, and the degree that the signal is mixed in the noise in $F_{00}$-$F_{03}$ is smaller in comparison with the process of the conventional method performing noise extraction by noticing simply an amplitude only of the field difference signal.

Figure 3:
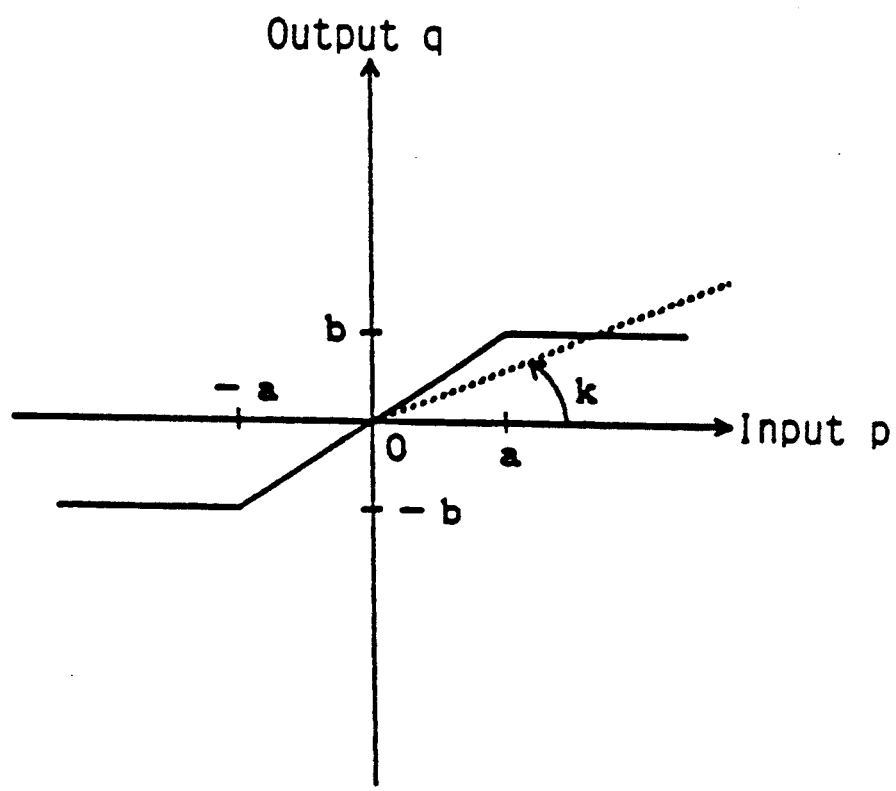
FIG. 3 is a characteristic chart showing an input-output characteristic of a nonlinear process part.

The transformed signal Oc is nonlinear-processed in compliance with an input-output characteristic by the nonlinear processing part 5 as shown in FIG. 3 for example, and extraction of the noise is carried out.

FIG. 3 shows one example of a nonlinear characteristic which is preferable for noise extraction. Referring to the same figure, abscissa designates an input signal, ordinate designates an amplitude of the output signal. The characteristic is represented as equations (11), (12), (13).

$$q=b \quad (p \geq a) \quad (11),$$

$$q=p \cdot (b/a) \quad (-a \leq p \leq a) \quad (12),$$

$$q=-b \quad (p \leq -a) \quad (13).$$

Such the process is realizable by using a ROM (read only memory) for example.

Letter k in the figure, means that this process is equivalent to multiply process of k which is $k=q/p$, in the case that the signal of the amplitude p is inputted and the signal of the amplitude q is output. This k is a gradient of a straight line passing the origin and a point (p, q) in the figure; and for example, when the input p is a positive value, k has a constant value b/a under $p \leq a$, and the value of k becomes b/p under $\geq a$, and as p becomes larger, the k asymptotically approaches to 0. This characteristic is a characteristic which is suitable for the noise extraction as mentioned in the item of the prior art.

Since the output signal of the nonlinear process part 5 is the Hadamard-transformed noise, the Hadamard inverse transformation is required. The Hadamard inverse transformation of 2×4 dimension is represented by equation (14) by using F, X, $H_2$, $H_4$ which are identical with the equations (2), (3).

$$X = (\tfrac{1}{8}) \cdot H_2 \cdot F \cdot H_4 \qquad (14).$$

For example $x_{11}$ in this, namely only $$x_{11} = \tfrac{1}{8} \cdot (F_{00} - F_{01} + F_{02} - F_{03} - F_{10} + F_{11} - F_{12} + F_{13}) \qquad (15)$$

is derived by an Hadamard inverse transformation device 6 (output Oe), and is subtracted from the input video signal by a second subtracter 7. The above-mentioned process is applied to each signal block which is shifted successively by one pixel in the horizontal direction as shown in FIG. 4.

As shown by FIG. 4, every 8 data are made into one block and are transformed as s, t, . . . , and the nonlinear process is applied, to make S, T, . . . . Only data corresponding to $x_{11}$ are proceeded to derive from S, T, . . .

Thus, the boundary of the block becomes every one data, namely every one pixel, and hence becomes hardly conspicuous.

Moreover, since only one data is preferably derived, the circuit scale of the inverse transformation circuit 6 is small. Furthermore, by making one data to be derived by the inverse transformation any one of $x_{10}$–$x_{13}$, the output of the Hadamard inverse transformation device 6, and the input video signal can also be input to the second subtracter 7 without going through the 1H delay element. Accordingly, the circuit scale can be reduced.

Hereupon, reason why one data to be derived by the inverse transformation is set to $x_{11}$ is elucidated in the followings: If one data to be derived is $x_{10}$, $x_{12}$ or $x_{13}$, in the case that an edge having a large level difference have moved in the horizontal direction, ringings are generated after the edges. This state is elucidated by using FIG. 8.

Figure 8:
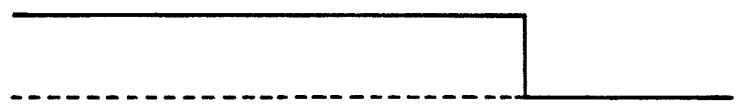
FIG. 8 is a timing chart for elucidating a state generating ringing in the case that an edge which is large in a level difference has moved.
Figure 8:
Figure 8:
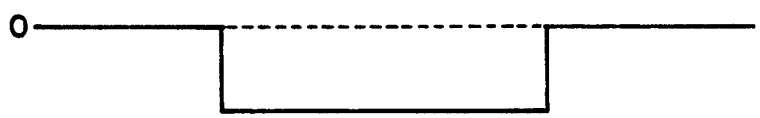
Figure 8:
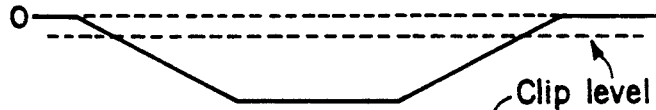
Figure 8:
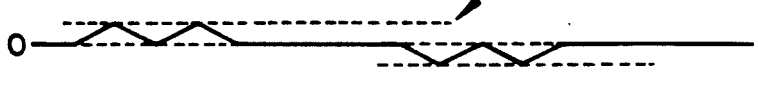
Figure 8:
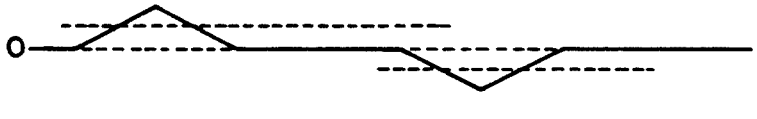
Figure 8:
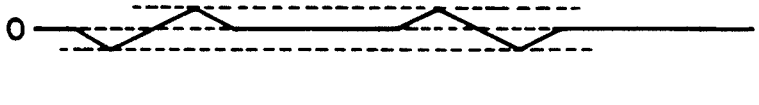
Figure 8:
Figure 8:
Figure 8:
Figure 8:
Figure 8:
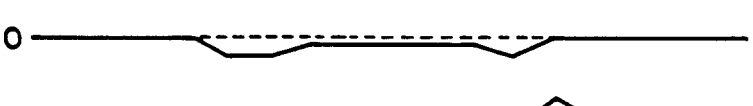
Figure 8:
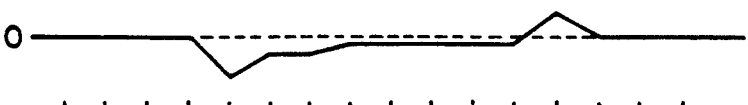
Figure 8:

FIG. 8 shows the state of the Hadamard transformation/inverse transformation in the above-mentioned case.

As shown in FIG. 8, when the position of the edge which is uniform on the previous field and the present field in the vertical direction varies, the field difference signal and the component $F_{00}$–$F_{03}$ which are derived by the Hadamard transformation thereof become as shown by FIG. 8.

Now, a case is considered here that the edge is uniform in the vertical direction, $F_{10}$–$F_{13}$ in this case become 0 from the equations (2), (3), and hence, consideration is made only as to $F_{00}$–$F_{03}$.

It is assumed that when the nonlinear process has applied to these components, the part where the amplitude is larger is clipped with the level shown by a dotted line in FIG. 8, $x_{10}$ is derived by the inverse transformation, and then a "peak" is generated at the edge part of the field difference signal as in FIG. 8. If (present field $-x_{10}$) is derived therefrom, then ringings are generated after the edge.

Therefore, if $x_{11}$ is derived instead of $x_{10}$, the above-mentioned "peak" is not generated in the $x_{11}$, and generation of the ringings in the (present field $-x_{11}$) is suppressed.

Considering the case of deriving $x_{12}$ or $x_{13}$ is similar, waveforms of both become as shown in FIG. 8. It is recognized from the figure that derivation of $x_{11}$ is the most effective, since the other have the possibility of generation of the ringings. And, in the present embodiment, though the block is composed of the successive four data in the horizontal direction and the successive two data in the vertical direction in the Hadamard transformation, the respective data need not be successive.

Moreover, the number of data in the horizontal and vertical directions which constitute the block needs not be limited to 4 and 2, respectively.

INDUSTRIAL APPLICABILITY

As has been described above in the embodiment the present invention can realize a noise reduction apparatus wherein generation of the block distortion is suppressed even using the Hadamard transformation, and at the same time the circuit scale can be reduced. Furthermore, generation of a ringing, which is generated in case where an edge of a large level difference have moved, can be suppressed, and the effect is great.

We claim:

1. A noise reduction apparatus for reducing noise in an input video signal, the input signal containing pixel data, the apparatus comprising:
    first delay means for delaying an input video signal to derive a first delayed video signal;
    first substraction means for subtracting said first delayed video signal from said input video signal and for outputting a finite difference signal;
    second delay means for delaying said finite difference signal output from said first subtraction means by one horizontal scanning period;
    transforming means for forming a signal block from the finite difference signal which includes a first predetermined number of pixel data, and in said signal block, for transforming said first predetermined number of pixel data into a second predetermined number of characteristic components based on said finite difference signal and said finite difference signal delayed by said second delay means, and for shifting said signal block one pixel data in a predetermined direction after every transforming operation;
    nonlinear calculation means for applying a nonlinear calculation to the characteristic components;
    inverse-transformation means for deriving one compensation output corresponding to said signal block based on the output signal of said nonlinear calculation means; and
    a second subtraction means for subtracting said compensation output to said input video signal to reduce noise in said input video signal.

2. A noise reduction apparatus in accordance with claim 1, wherein
    said first predetermined number of pixels in said signal block are arranged in a matrix of M rows and N columns; and
    said inverse-transformation means derives said compensation output based on pixel data in the (N-1)th column of said pixel block.

3. A noise reduction apparatus in accordance with claim 1, wherein said first delay means has a delay time equal to a scanning time of one frame.

4. A noise reduction apparatus in accordance with claim 1, wherein said first delay means has a delay time equal to a scanning time of one field.

5. A noise reduction apparatus in accordance with claim 1, wherein said first delay means has a delay time equal to a scanning time of a third predetermined number of lines.

6. A noise reduction apparatus in accordance with claim 1, wherein said transformation means comprises a signal block forming means having a third predetermined number of shift registers.

7. A noise reduction apparatus in accordance with claim 1, wherein said transformation means comprises:

a signal block forming means having a third predetermined number of shift registers; and a fourth predetermined number of delay means, said delay means having a delay time corresponding to a scanning time of one scanning line.

* * * * *